US011728603B2

(12) United States Patent
Skrzypczak et al.

(10) Patent No.: US 11,728,603 B2
(45) Date of Patent: Aug. 15, 2023

(54) METHOD FOR SEALED FUSE HOLDER WITH ISO MICRO RELAY

(71) Applicant: Littelfuse, Inc., Chicago, IL (US)

(72) Inventors: Michael J. Skrzypczak, Lombard, IL (US); Dave G. Kotowski, Geneva, IL (US)

(73) Assignee: Littelfuse, Inc., Chicago, IL (US)

( * ) Notice: Subject to any disclaimer, the term of this patent is extended or adjusted under 35 U.S.C. 154(b) by 218 days.

(21) Appl. No.: 17/332,244

(22) Filed: May 27, 2021

(65) Prior Publication Data

US 2022/0385015 A1 Dec. 1, 2022

(51) Int. Cl.
*H01R 33/76* (2006.01)
*H02B 1/28* (2006.01)
*H02B 1/48* (2006.01)
*H01H 45/14* (2006.01)
*H01R 33/88* (2006.01)

(52) U.S. Cl.
CPC ............ *H01R 33/765* (2013.01); *H02B 1/28* (2013.01); *H02B 1/48* (2013.01); *H01H 45/14* (2013.01); *H01R 33/88* (2013.01)

(58) Field of Classification Search
CPC .......... H02B 1/48; H02B 1/28; H01R 33/765; H01H 9/04; H01H 50/023; H01H 2050/049; H01H 50/048; H02G 3/088; B60R 16/0238
See application file for complete search history.

(56) References Cited

U.S. PATENT DOCUMENTS

| 5,709,567 A * | 1/1998 | Gladd ................. H01R 9/2466 439/444 |
| 5,951,333 A * | 9/1999 | Gladd ................. H01R 9/2458 439/713 |
| 6,126,457 A | 10/2000 | Smith |
| 2008/0180884 A1 * | 7/2008 | Parrish ............... B60R 16/0238 361/624 |
| 2014/0160697 A1 | 6/2014 | Stern |

FOREIGN PATENT DOCUMENTS

CN 213072029 U 4/2021

OTHER PUBLICATIONS

European Search Report and Written Opinion for the Application No. EP22174774, dated Oct. 13, 2022, 8 pages.

* cited by examiner

*Primary Examiner* — Jean F Duverne
(74) *Attorney, Agent, or Firm* — KDW Firm PLLC

(57) ABSTRACT

A novel electrical box to house one or more ISO micro relays, is adapted to support IP67 and IP69K Ingress Protection ratings. The housing of the electrical box is molded with blade sockets that correspond to blade positions of the ISO micro relay. The housing is also molded with terminal seats and cylindrical openings which vary, depending on the blade socket, enabling terminals of different sizes, orientations, and positions relative to the respective blades, to be easily inserted into the back of the housing. The resulting position of the terminals ensures that electrical connections to the ISO micro relay are made and ingress protection of components inside the electrical box is ensured.

13 Claims, 14 Drawing Sheets

METHOD FOR SEALED FUSE HOLDER WITH ISO MICRO RELAY

FIELD OF THE DISCLOSURE

Embodiments of the present disclosure relate to electrical boxes that house ISO micro relays and, more particularly, to electrical boxes that satisfy IP67 and IP69K Ingress Protection ratings.

BACKGROUND

Vehicles are equipped with a variety of electrically powered equipment. These electrically powered devices may be controlled by an electrical box known as a power distribution module (PDM). PDMs are installed in applications to ensure circuits are protected, controlled, and/or sensed. PDMs provide centralized, safe power distribution for many applications, and may include fuses, relays, circuit breakers, and other components.

The environment within a vehicle presents a challenge for the PDM, as the ingress of water and other contaminants must be strictly protected. Manufacturing a PDM that has both IP67 (total protection from dust and protected from temporary liquid immersion) and IP69K (proven to resist ingress of high temperature and pressure wash) Ingress Protection ratings is challenging because the components are accessed during maintenance, and thus cannot be permanently sealed within the hard-wired box of the PDM.

One of those components may be a relay, which is an electrically operated switch. An ISO relay is one which adheres to a standard pattern for its electrical terminals that has been spelled out by the International Standards Organization (ISO). ISO micro relays are used in automotive switching applications such as for lamps and motors. ISO-style relays also generally plug into their end application via sockets, such as a PDM. Housing an ISO micro relay in a PDM is not difficult but providing a PDM that satisfies the IP67/IP69K Ingress Protection ratings is challenging.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of an electrical box in accordance with the present disclosure may include a housing with a relay socket. The relay socket consists of a first, second, and third blade sockets, and first, second, and third terminal seats. The second blade socket is adjacent and parallel to the first blade socket. The third blade socket is orthogonal to the first blade socket and adjacent to the second blade socket. The relay socket is adapted to accept an ISO micro relay. The first terminal seat, adapted to receive a first terminal, is located in a center position of the first blade socket. The second terminal seat, adapted to receive a second terminal, is located in a center position of the second blade socket. The third terminal seat, adapted to receive a third terminal, is located in one end of the third blade socket.

An exemplary embodiment of a relay socket in accordance with the present disclosure may include first, second, and third blade sockets and first, second, and third terminal seats. The first blade socket is adapted to receive a first blade of an ISO micro relay and has a first edge and a second edge. The second blade socket, adjacent and parallel to the first blade socket, is adapted to receive a second blade of the ISO micro relay and has a third edge and a fourth edge, the third edge being proximate the first edge and the fourth edge being proximate the second edge. The third blade socket, adjacent and parallel to the second blade socket, is adapted to receive a third blade of the ISO micro relay and has a fifth edge and a sixth edge, the fifth edge being proximate the third edge and the sixth edge being proximate the fourth edge. The first terminal seat, adapted to receive a first terminal, is located at the first edge of the first blade socket. The second terminal seat, adapted to receive a second terminal, is located at the fourth edge of the second blade socket. The third terminal seat, adapted to receive a third terminal, is located at the fifth edge of the third blade socket.

An exemplary embodiment of a housing for use in an electrical box in accordance with the present disclosure may include a component side and a terminal side and also includes a relay socket which is adapted to receive an ISO micro relay. The relay socket includes first, second, and third cross-shaped openings. The first cross-shaped opening is adapted to receive a first blade of the ISO micro relay on the component side and a first terminal on the terminal side. The second cross-shaped opening is adapted to receive a second blade of the ISO micro relay on the component side and a second terminal on the terminal side. The third cross-shaped opening is adapted to receive a third blade of the ISO micro relay on the component side and a third terminal on the terminal side. The second cross-shaped opening is identical to the third cross-shaped opening.

DETAILED DESCRIPTION

A novel electrical box design, suitable for ISO Micro relays, is disclosed herein. The electrical box is adapted to support IP67 and IP69K Ingress Protection ratings. The housing of the electrical box is molded with blade sockets that correspond to blade positions of the ISO micro relays. The housing is also molded with terminal seats and cylindrical openings which vary, depending on the blade socket, enabling terminals of different sizes, orientations, and positions relative to the respective blades, to be easily inserted into the back of the housing. The resulting position of the terminals ensures that electrical connections to the ISO micro relay are made and ingress protection of components inside the electrical box is ensured.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components of the electrical box, each with respect to the geometry and orientation of other features and components of the electrical box appearing in the perspective, exploded perspective, and cross-sectional views provided herein. Said terminology is not intended to be limiting and includes the words specifically mentioned, derivatives therein, and words of similar import.

Figure 1:
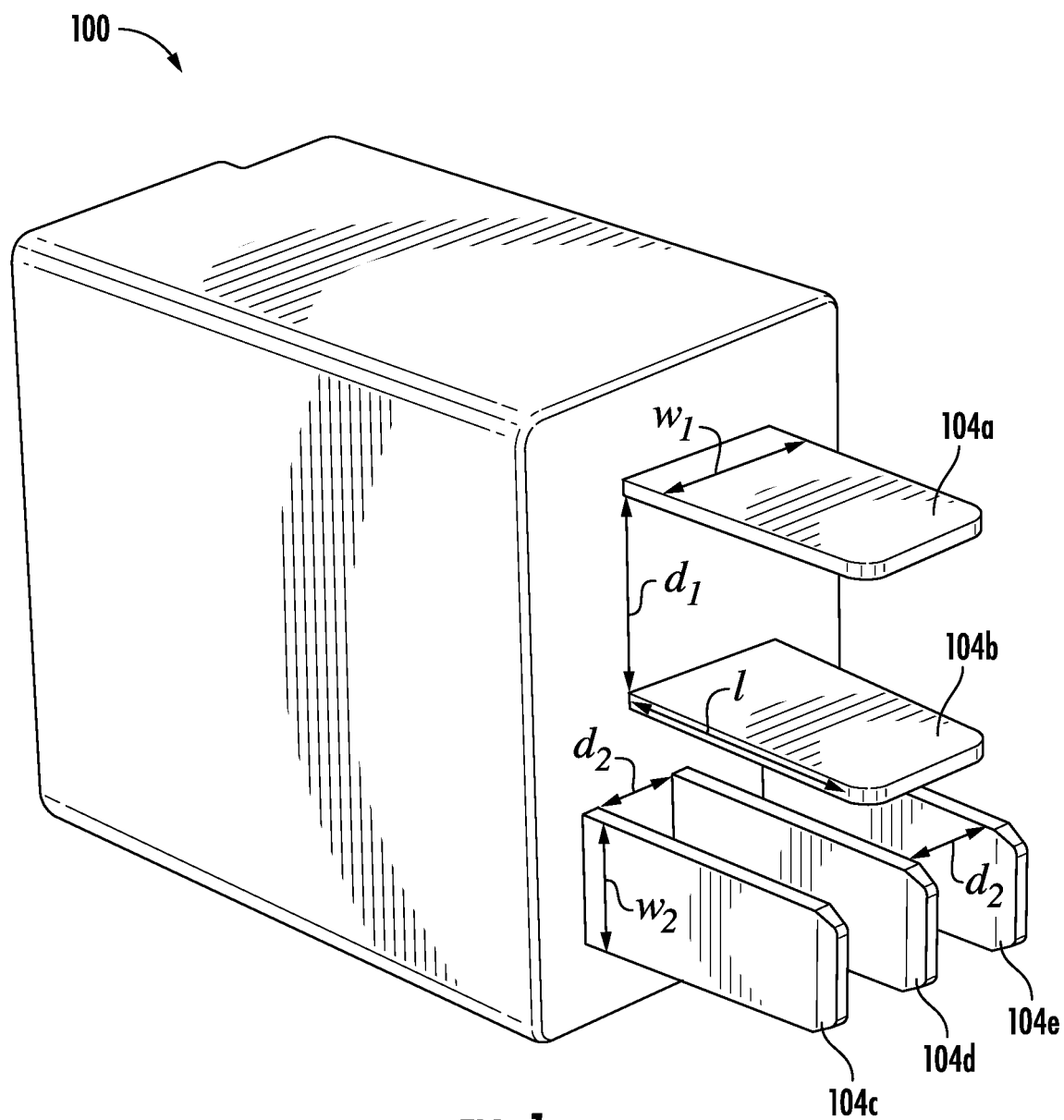
FIG. 1 is an illustration of an ISO micro relay, in accordance with the prior art.

FIG. 1 is a representative perspective illustration of a relay 100, according to the prior art. The relay 100 is one which adheres to a standard pattern for its electrical terminals that has been spelled out by the International Standards Organization (ISO), and thus may be thought of as an ISO relay. Further, because the relay is somewhat smaller than standard relays, this type of relay is known as an ISO micro relay. ISO micro relays 100 are standard off-the-shelf components with five blades 104a-e (collectively, "blades 104"). The ISO micro relay 100 establishes a connection to a circuit by being plugged into a socket. As one example, the socket may be part of an electrical box, enabling a connection to be established between the ISO micro relay and a switching application.

The blades 104 of the ISO micro relay 100 are oriented in a particular configuration. Two of the blades 104a and 104b are oriented in one way (top of the relay and horizontally disposed, in the view of FIG. 1) while the remaining three blades 104c, 104d, and 104e are orientated in another way (bottom of the relay and vertically disposed, in the view of FIG. 1), which is orthogonal to the blades 104a and 104b. The blades 104a and 104b are also a different size ($w_1$) than the blades 104c, 104d, and 104e ($w_2$), with $w_1 > w_2$. Further, the blades 104a and 104b are spaced a distance, $d_1$, apart, while the spacing between blades 104c and 104d and blades 104d and 104e are a distance, $d_2$, apart, with $d_2$ being smaller than $d_1$. The blades are all approximately the same length, 1.

The ISO micro relay 100 terminates in a socket to create an electrical connection to the device or circuit being supported by the relay, where the socket further holds the relay in place. For products that are water-resistant or protected against complete temporary water submersion, the pass-through socket housing the ISO micro relay would be sealed. The layout of the ISO micro relay 100, where the blades 104 are oriented in a close configuration, however, does not enable the sealing of the socket housing.

Figure 2A:
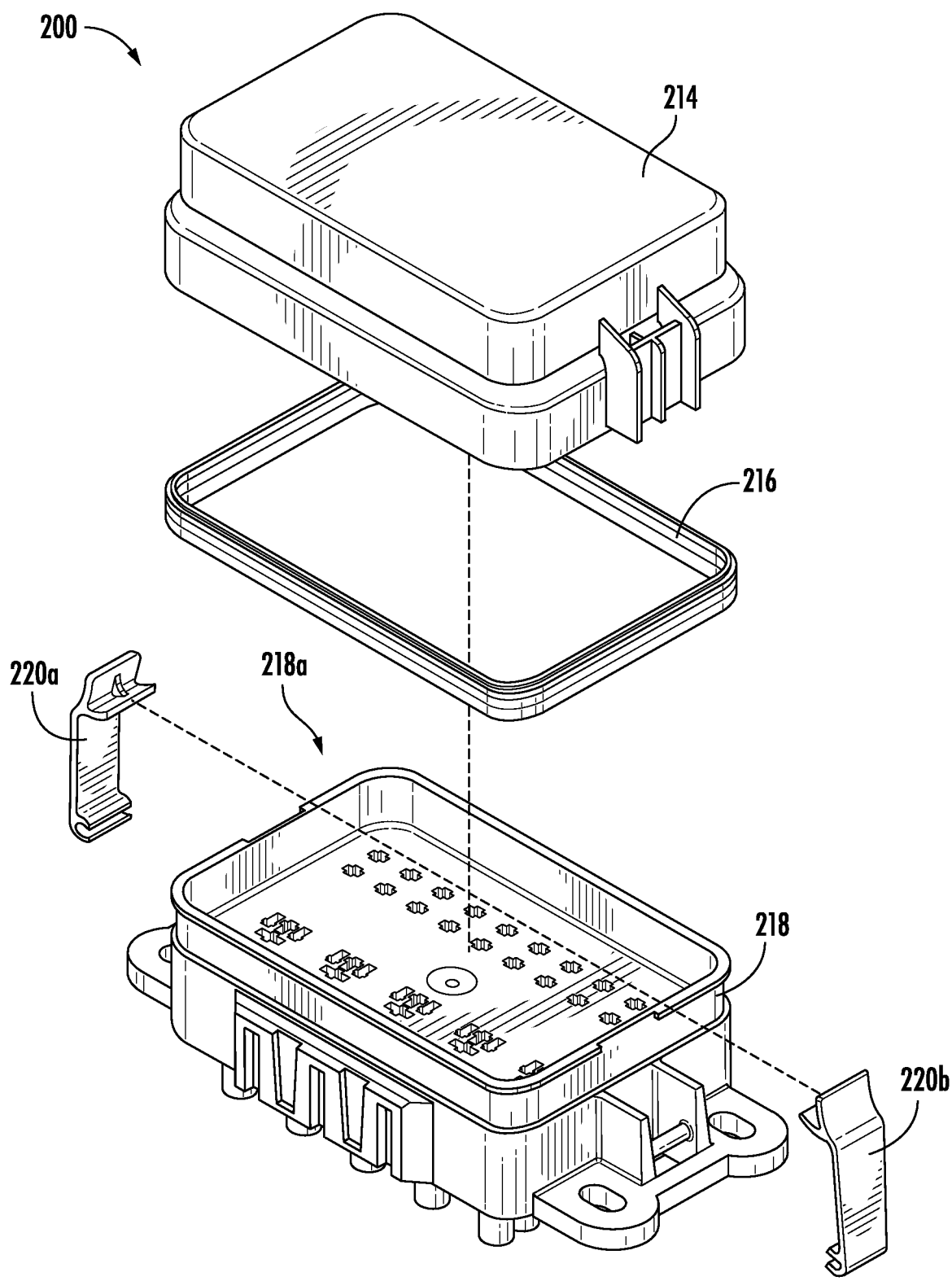
FIGS. 2A-2C are illustrations of a novel electrical box, in accordance with exemplary embodiments.
Figure 2B:
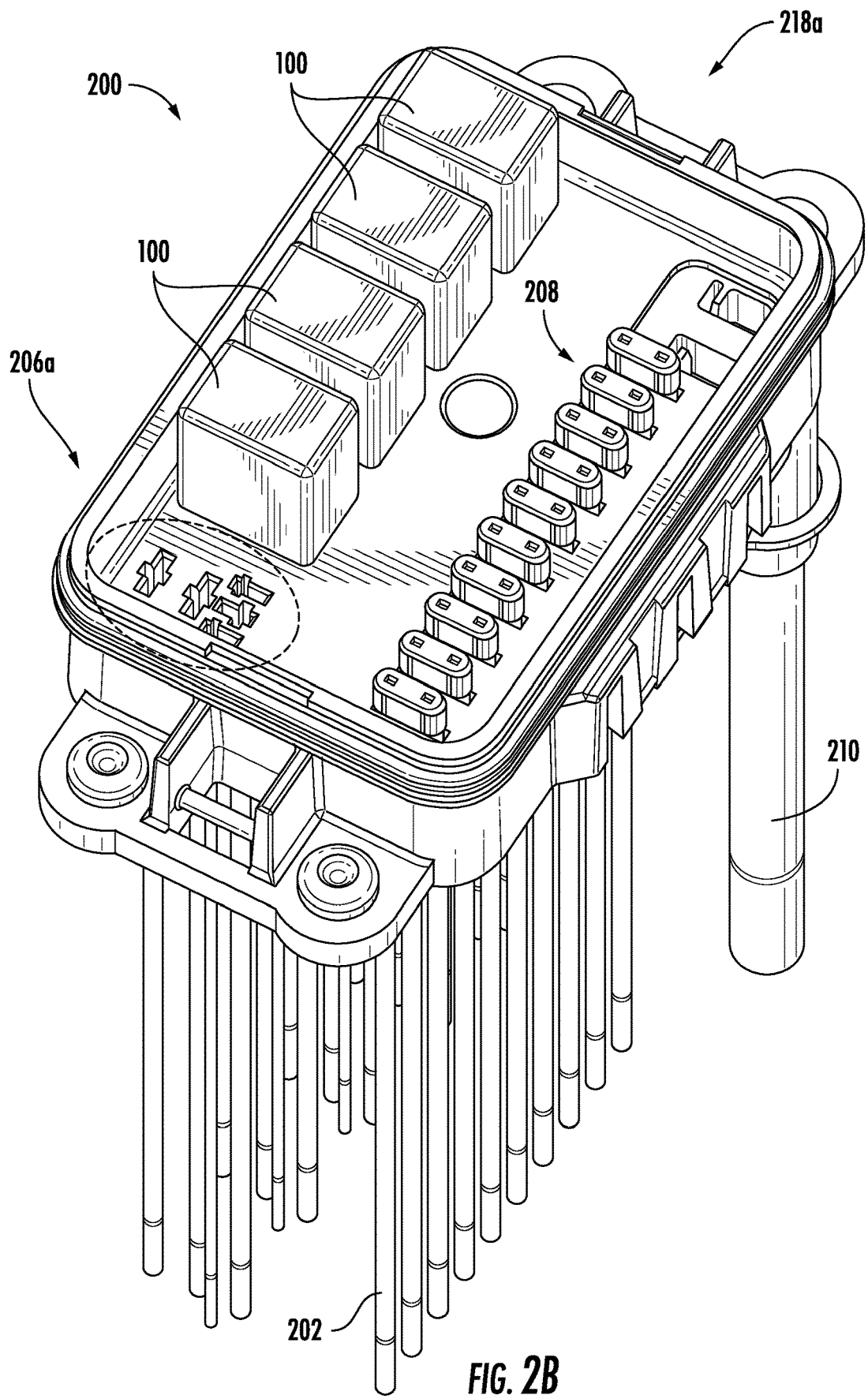
Figure 2C:
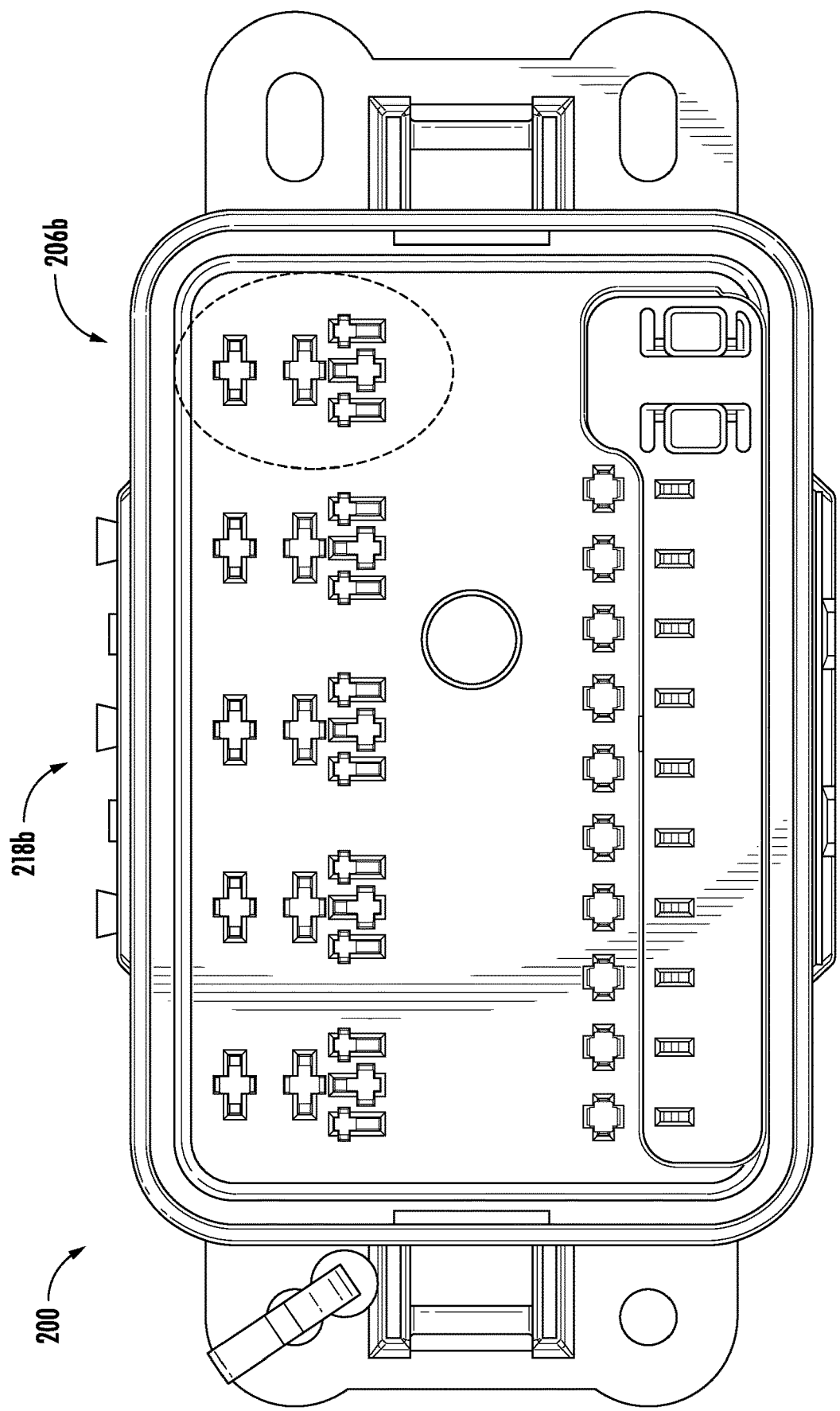

FIGS. 2A-2C are representative illustrations of an electrical box 200, according to exemplary embodiments. FIG. 2A is an exploded perspective view of the electrical box; FIG. 2B is a perspective view of the electrical box showing the component side of the housing; and FIG. 2C is a bottom view of the electrical box showing the terminal side of the housing. As will be shown, the novel electrical box 200 supports ISO micro relays, such as the ISO micro relay 100 of FIG. 1 and provides IP67 and IP69K protection against ingress of water or other contaminants into the electrical box, thus protecting all components within the electrical box.

The housing 218 of the electrical box 200 has two opposing sides, a component side of housing 218a (FIGS. 2A and 2B) and a terminal side of housing 218b (FIG. 2C), both of which are shown and described in greater detail herein. Four ISO micro relays 100 (FIG. 1) are shown, with a relay socket capable of receiving a fifth ISO micro relay. The number of relays shown in the electrical box 200 is not meant to be limiting. The relays 100 and fuses 208 are seated in the component side of housing 218a and power cables 210 and terminals 202 are connected to the terminal side of housing 218b. A cover 214 fits over the housing 218 to protect the relays 100 and fuses 208. A seal 216 disposed between the cover 214 and the housing 218 provides additional protection against ingress of water/contaminants. Latches 220a and 220b (collectively, "latches 220") are fastened on either side of the cover 214 and also engage with the housing 218. The latches 220 secure the cover 214 to the housing 218. As this disclosure concerns the relays 100 and not the fuses 208, no further discussion is included about the fuses.

The electrical box 200 is designed to provide electrical connection between the relays 100 and external components by way of the power cable 210 and terminals 202. Since the relays 100 each include five blades 104 (FIG. 1), there are five dedicated terminals 202 associated with each relay, one for each blade. The relays 100 are inserted into dedicated sockets in the component side of housing 218a. The terminals 202 are connected to the terminal side of housing 218b such that they establish a connection to respective relays 100 through the housing 218. Once power is delivered to the electrical box 200 through the power cable 210, an electrical connection is established between the relays 100 and respective terminals 202.

A relay socket for receiving an ISO micro relay is illustrated on both sides of the housing 218. Relay socket 206a is featured on the component side of housing 218a (FIG. 2B) and relay socket 206b is featured on the terminal side of housing 218b (FIG. 2C) (collectively, "relay socket 206"). The relay 100 of FIG. 1 may fit in the relay socket 206, for example. Thus, the relay socket 206 is to be connected to five terminals 202, one for each blade of the ISO micro relay, to establish an electrical connection between the relay and circuitry connected to the electrical box 200.

Though the electrical box 200 is designed with the relays 100 and terminals 202 in mind, the relays and terminals are not part of the electrical box. Instead, both the relays 100 and terminals 202 are standard, off-the-shelf parts purchased by customers who utilize the electrical box 200. To understand the challenges of designing the electrical box 200 to be IP67- and IP69K-compliant, a better understanding of the terminals 202 is warranted.

Figure 3A:
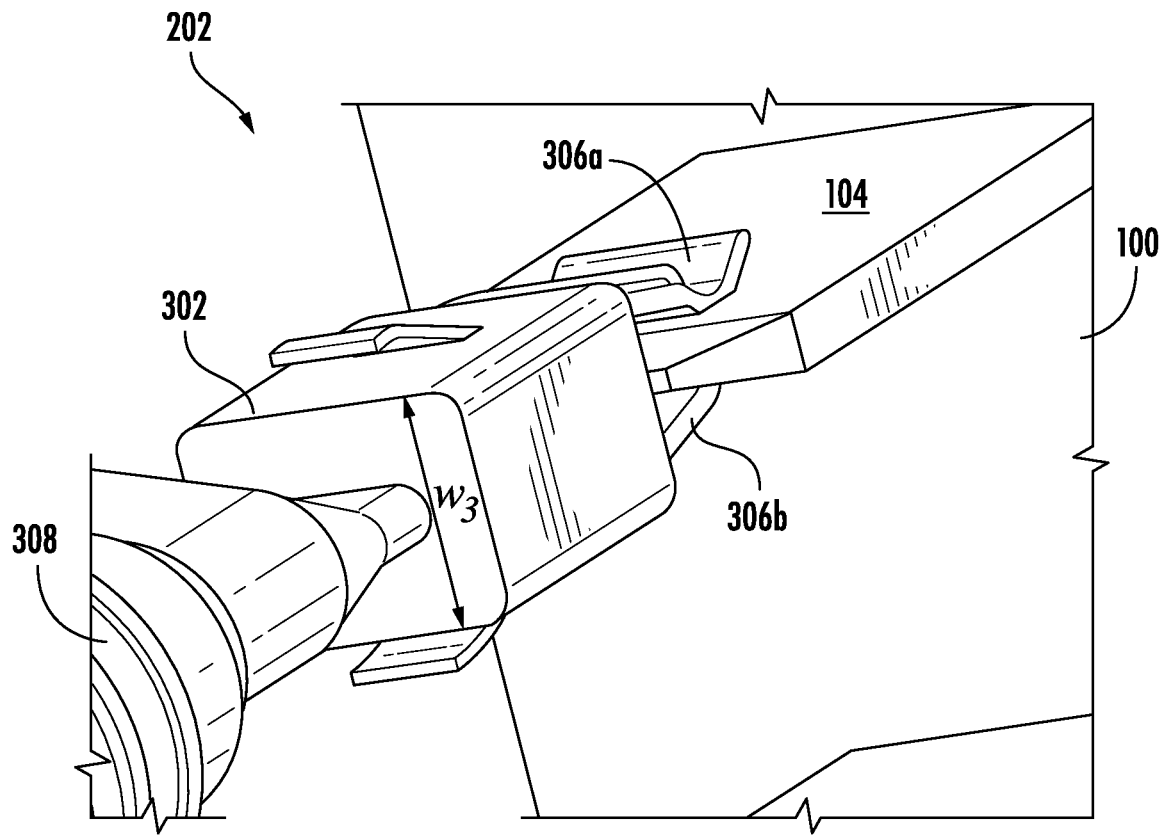
FIGS. 3A and 3B are illustrations of a terminal to be connected to an ISO micro relay in the electrical box of FIGS. 2A-2C, in accordance with the prior art.
Figure 3B:
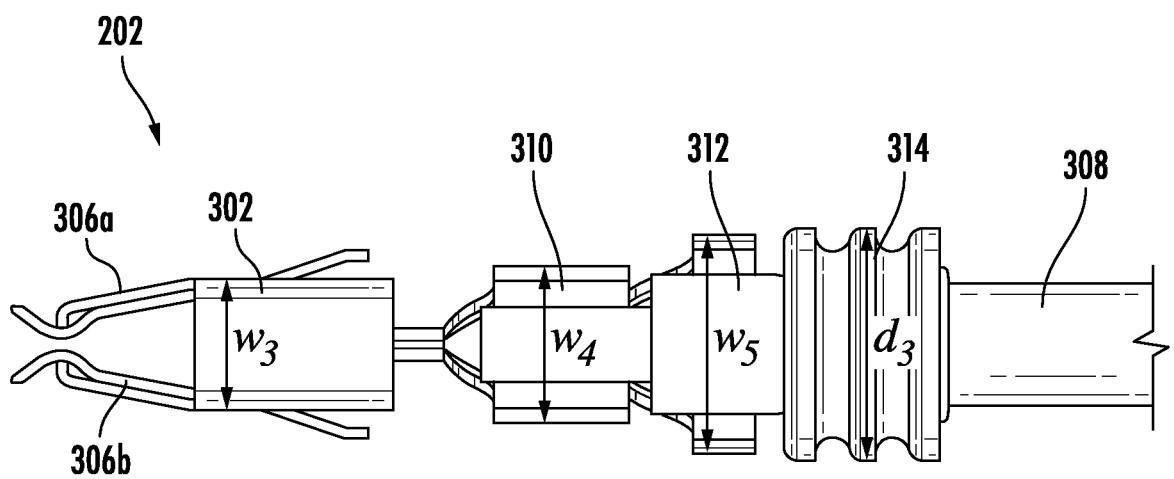

FIGS. 3A and 3B are representative drawings of the terminal 202, according to the prior art. In FIG. 3A, the terminal 202 is attached to one blade 104 of the ISO micro relay 100 (FIG. 1). The terminal 202 features a device cable 308 and a rubber seal 314, along with a three-part connector consisting of a socket interface 302, a wire crimp area 310, and a seal crimp area 312. The socket interface 302 includes clips 306a and 306b (collectively, "clips 306"), which are the parts of the terminal 202 that will mate with the blade 104. Alternatively, the terminal 202 may be attached to components other than blades, such as busbars or other electrically conductive elements.

The clips 306 are spring-tensioned to be initially touching one another before attachment to something. When pushed against an edge of the blade 104, the two clips 306 separate just enough that the blade fits between the two clips. The terminal 202 thus becomes fixably attached to the blade 104. This attachment allows an electrical connection to be established between the ISO micro relay 100 and the terminal 202. One clip 306a slides against one side of the blade 104 while the other clip 306b slides against the other side of the blade. The spring tension causes the clip 306 to remain connected to the blade 104 until the terminal 202 is removed from the blade.

The clips 306 of the socket interface 302, as well as the wire crimp area 310 and seal crimp area 312 are made of an electrically conductive material. When power is delivered to the electrical box 200, a current will pass through the blade 104 to the clips 306, through the socket interface 302, the wire crimp area 310, the seal crimp area 312, and through the wiring inside the device cable 308, and vice-versa. Thus, the terminal 202 facilitates flow of electrical current between the ISO micro relay 100 and whatever device/circuit the device cable 308 is connected to.

The rubber seal 314 of the terminal 202 has a diameter, $d_3$ (FIG. 3B), while the socket interface 302 has a width, $w_3$ (FIG. 3A). The diameter, $d_3$, of the rubber seal 314 is larger than the width, $w_3$, of the socket interface 302, the width, $w_4$, of the wire crimp area 310, and the width, $w_5$, of the seal crimp area. Thus, the diameter, $d_3$, of the rubber seal 314 is the widest part of the terminal 202. To support different applications, the terminal 202 is available in different sizes. As will be shown, the electrical box 200 supports terminals 202 of two different sizes for connection to the ISO micro relay 100.

At the electrical box 200, two clips 306 for each blade 104 are disposed on the terminal side of housing 218b, where the relays 100 are plugged into the relay socket 206a on the component side of housing 218a. Though not fully visible in FIG. 2B, each of the terminals 202 ends at the relay socket 206b of the electrical box 200. Thus, when the relay 100 is inserted into the relay socket 206, each blade 104 automatically fits into the two clips 306 of its respective terminal 202, for a total of five terminals. Further, each terminal 202 includes a rubber seal 314, which is the widest part of the terminal. Thus, each terminal 202 will need a space greater than the diameter, $d_1$, of the rubber seal 314 in the relay socket 206b.

Figure 4A:
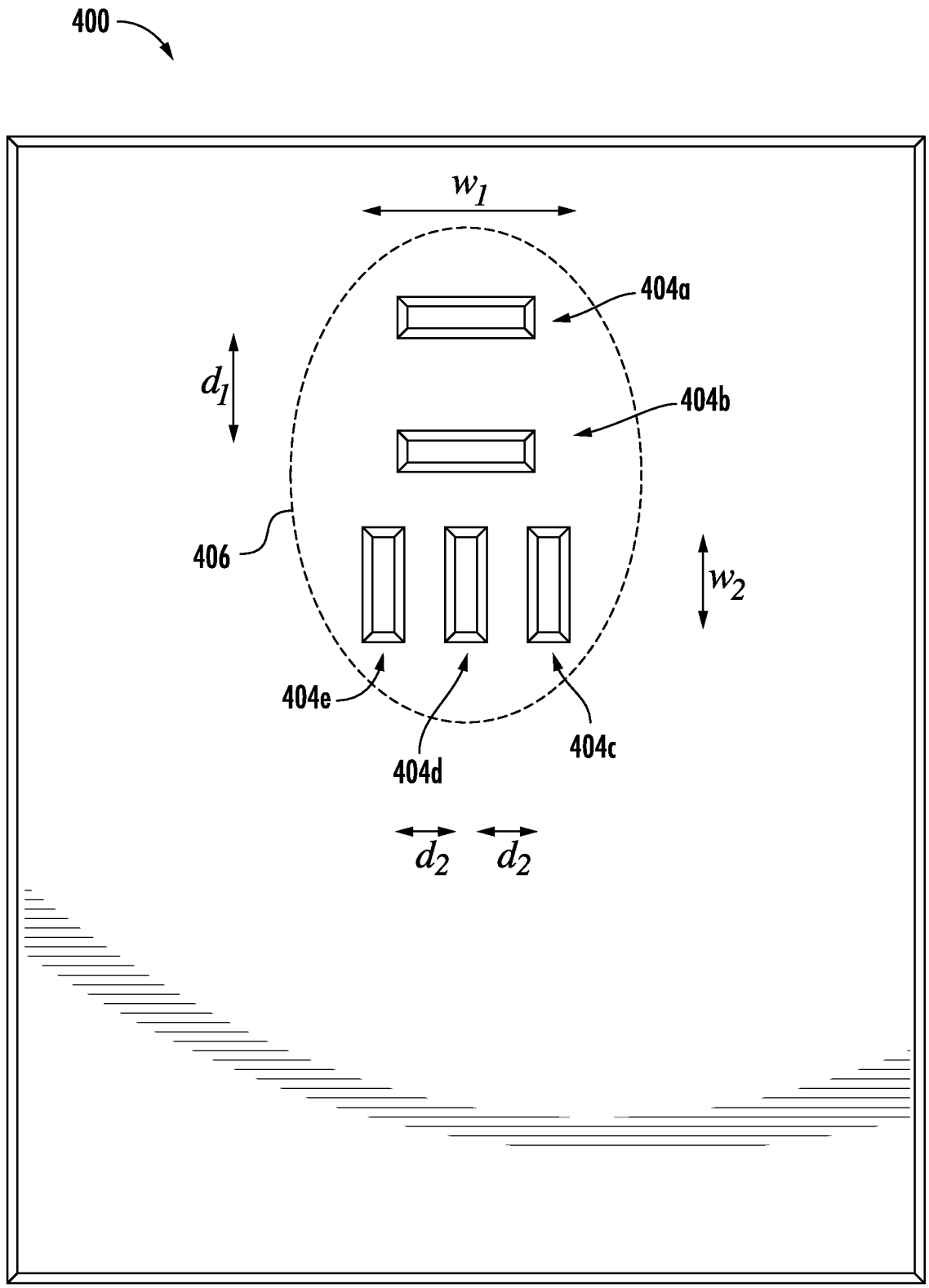
FIGS. 4A and 4B are illustrations of a relay socket, in accordance with the prior art.
Figure 4B:
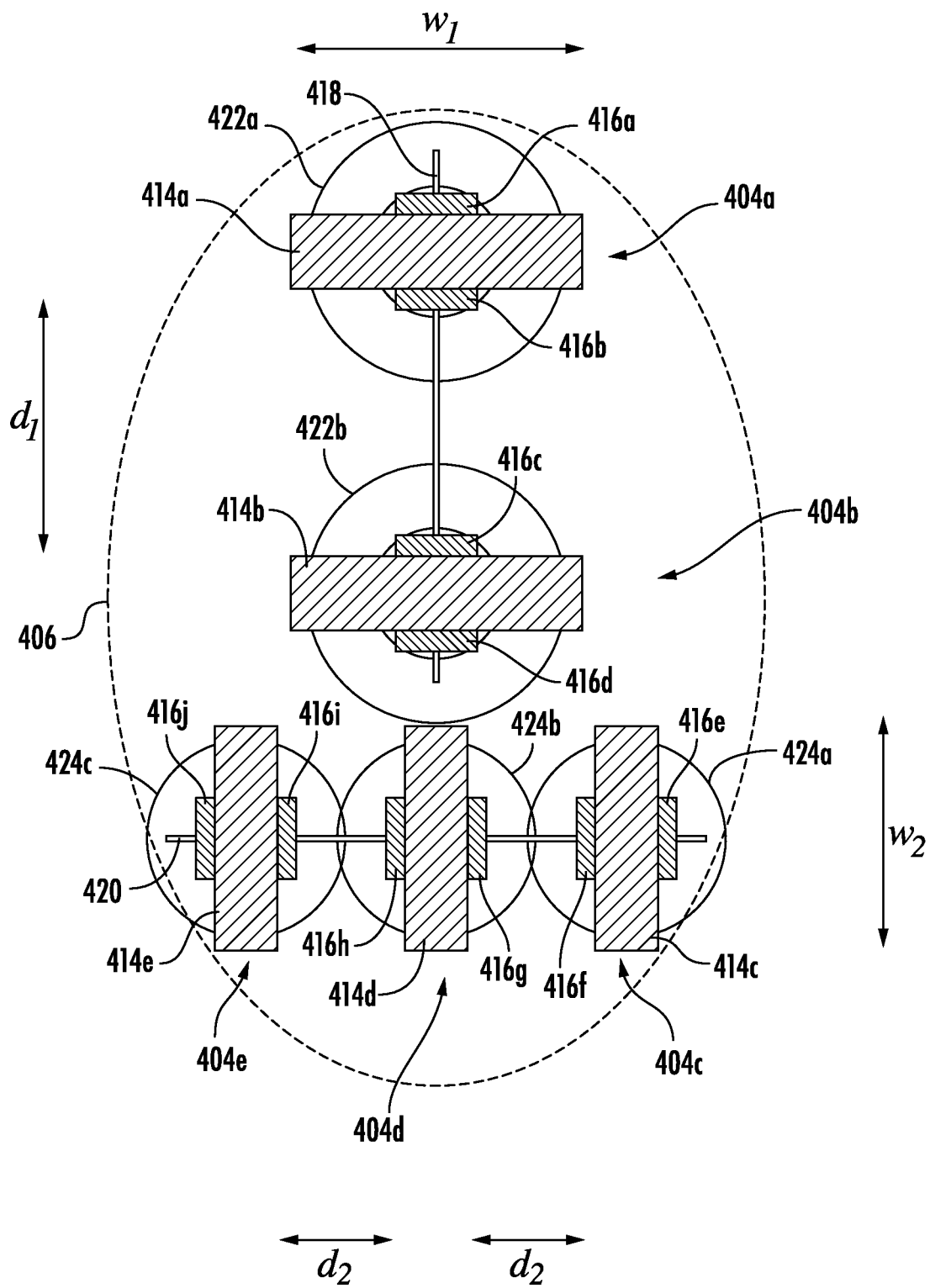

FIGS. 4A and 4B are representative illustrations of the relay socket portion of an electrical box 400, according to the prior art. FIG. 4A is a top view of a relay socket 406 that is part of the prior art electrical box 400 while FIG. 4B shows relative placement of elements of the relay socket 406. The relay socket 406 includes five blade sockets 404a-e (collectively, "blade sockets 404"), for receiving five blades of an ISO micro relay, such as the ISO micro relay 100 (FIG. 1).

To receive the ISO micro relay 100, the blade sockets 404 are oriented in a particular configuration. Two of the blade sockets 404a and 404b are oriented in one way (top of the relay socket 406 and horizontally disposed, in the illustrated views). The remaining three blade sockets 404c, 404d, and 404e are orientated in another way (bottom of the relay socket 406 and vertically disposed, in the illustrated views), with the blade sockets 404c, 404d, and 404e being orthogonal to the blade sockets 404a and 404b. The blade sockets 404a and 404b are of a first size ($w_1$), to correspond with the size, $w_1$, of blades 104a and 104b (FIG. 1); the blade sockets 404c, 404d, and 404e are of a different size ($w_2$), to correspond with the size, $w_2$, of blades 104c, 104d, and 104e, with $w_1 > w_2$. The blade sockets 404a and 404b are spaced a distance, $d_1$, apart, corresponding to the distance, $d_1$, between blades 104a and 104b; the spacing between blade sockets 404c and 404d ($d_2$) correspond with the distance between blades 104c and 104d; and the spacing between blade sockets 404d and 404e (also $d_2$) correspond with the distances between blades 104d and 104e, with $d_2 < d_1$. Further, though shown in two dimensions, each blade socket 404 has a depth sufficient to receive the length, 1, of respective blades. Thus, the blade sockets 404 are sized to accept respective blades 104 of the ISO micro relay 100.

The relay 100, once inserted into the relay socket 406, connects with terminals on the other side of the prior art electrical box 400 (not shown). FIG. 4B feature blade location indicators (patterned with upward diagonal stripes) (collectively, "blade location indicators 414") and clip location indicators (patterned with downward diagonal stripes) (collectively, "clip location indicators 416"). The blade location indicators 414 and the clip location indicators 416 illustrate how blades and terminals are seated into the respective blade sockets 404. The blade location indicators 414 show that each blade essentially "fills" the respective blade sockets 404. The blades 104 of the ISO micro relay 100 plug into the front of the relay socket 406 of the prior art electrical box 400 while the clips, such as the clips 306 of the terminal 202 (FIGS. 3A and 3B) plug into the back of the relay socket. FIG. 4B thus indicates relative placement of the terminals 202 and the blades 104 once the ISO micro relay 100 is inserted into the relay socket 406 of the prior art electrical box 400.

Thus, for blade socket 404a, blade location indicator 414a and clip location indicators 416a and 416b are shown; for blade socket 404b, blade location indicator 414b and clip location indicators 416c and 416d are shown. A position indicator 418 (disposed vertically in FIG. 4B) indicates that clip location indicators 416a-416d line up in the same plane with one another.

For blade socket 404c, blade location indicator 414c and clip location indicators 416e and 416f are shown; for blade socket 404d, blade location indicator 414d and clip location indicators 416g and 416h are shown; for blade socket 404e, blade location indicator 414e and clip location indicators 416i and 416j are shown. A position indicator 420 (disposed horizontally in FIG. 4B) indicates that clip position indicators 414e-414j line up in the same plane with one another.

The position indicators 418 and 420 thus show the typical "centered" location for where the clips, and thus terminals, are usually located (on the other side of the prior art electrical box 400). The position indicator 418 show that the clip location indicators 416a-d are in the same plane. Recall from the ISO micro relay 100 (FIG. 1) that the blades 104 are not all the same size. Blades 104a and 104b are a first width, $w_1$, while blades 104c, 104d, and 104e are a second width, $w_2$, with $w_2 < w_1$. Thus, it is possible to join the blades 104a and 104b with terminals 202 that are a first size, while blades 104c, 104d, and 104e are joined with terminals that are a second, smaller size. Recall that the rubber seal 314 of the terminal 202 (FIG. 3B) has a diameter, $d_3$, which is as wide or wider than any other component of the terminal. Thus, the rubber seal 314 governs the ability to successfully connect a terminal 202 to each blade of the ISO micro relay 100 into the relay socket 406 of the prior art electrical box 400.

Recall that the terminal 202 is a standard, off-the-shelf part available for purchase by a customer, where that customer also purchases the prior art electrical box 400. The customer may populate the prior art electrical box 400 with fewer relays and fuses than the electrical box supports. With respect to the relays, for example, the customer purchases the number of relays needed for the particular application, then purchases five terminals for each relay obtained, one terminal for each blade. Because two of the blades of each relay have larger dimensions than the remaining three blades, the customer would purchase two terminals of one size, and three terminals of a different, smaller size for each relay. Thus, the relays support terminals of two different sizes. And the corresponding rubber seals for each terminal are sized differently, with the larger terminal having a rubber seal that is larger than the smaller terminal. For this reason, FIG. 4B shows two different sizes of rubber seals.

FIG. 4B illustrates how the rubber seal of the terminal 202 fits, relative to each blade socket 404. Blade sockets 404a and 404b including rubber seal location indicators 422a and 422b, respectively (collectively, "rubber seal location indicators 422"). Blade sockets 404c, 404d, and 404e include rubber seal location indicators 424a, 424b, and 424c (collectively, "rubber seal location indicators 424"). Rubber seal location indicators 422 are larger than rubber seal location indicators 424. Thus, the blade 104 is inserted into the blade socket 404 on the component side of the prior art electrical box 400, while the clips 306 and the rubber seals 314 of the terminals 202, one for each blade 104, are "below" or "behind" the blade socket 404 on the terminal side of the prior art electrical box.

Further, clip location indicators 416b (for blade socket 404a) and 416c (for blade socket 404b) are spaced apart enough to fit the larger rubber seal around each terminal, as rubber seal location indicators 422a and 422b are not touching one another. The distance, $d_1$, between blade location indicators 414a and 414b is thus large enough to support the larger rubber seal.

However, this is not true for blade sockets 404c-e, even though they are to be fit with terminals having the smaller rubber seals. The position indicator 420 shows that the clip location indicators 416e-416j are in the same plane. But clip location indicator 416i (for blade socket 404e) is very close to clip location indicator 416h (for blade socket 404d) and clip location indicator 416g (for blade socket 404d) is very close to clip location indicator 416f (for blade socket 404c). Thus, the terminals 202 that are to be connected on the backside of the prior art electrical box 400 for three of the blade socket 404c-e will be too close together to include even the smaller rubber seal around each terminal.

Returning to FIGS. 2B and 2C, the novel electrical box 200 has a relay socket design that is different from what is shown in FIGS. 4A and 4B, according to exemplary embodiments. Based on the layout of its relay socket, as shown and described below, the novel electrical box 200 is able to provide IP67 and IP69K protection against ingress of water into the electrical box, thus sealing and protecting the ISO micro relays within the electrical box.

Figure 5A:
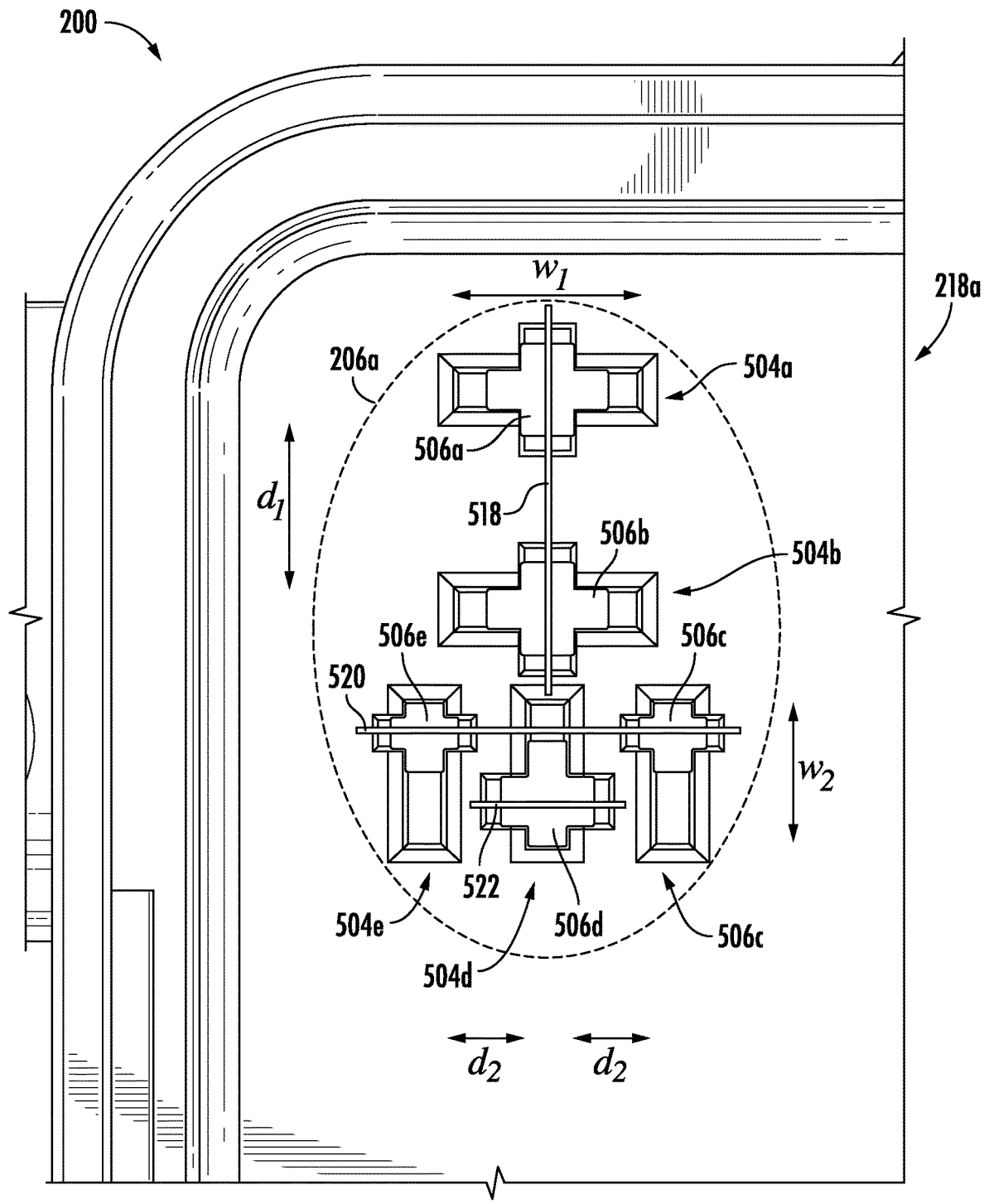
FIGS. 5A-5C are illustrations of a relay socket and terminal arrangement (component side) for the electrical box of FIGS. 2A-2C, in accordance with exemplary embodiments.
Figure 5B:
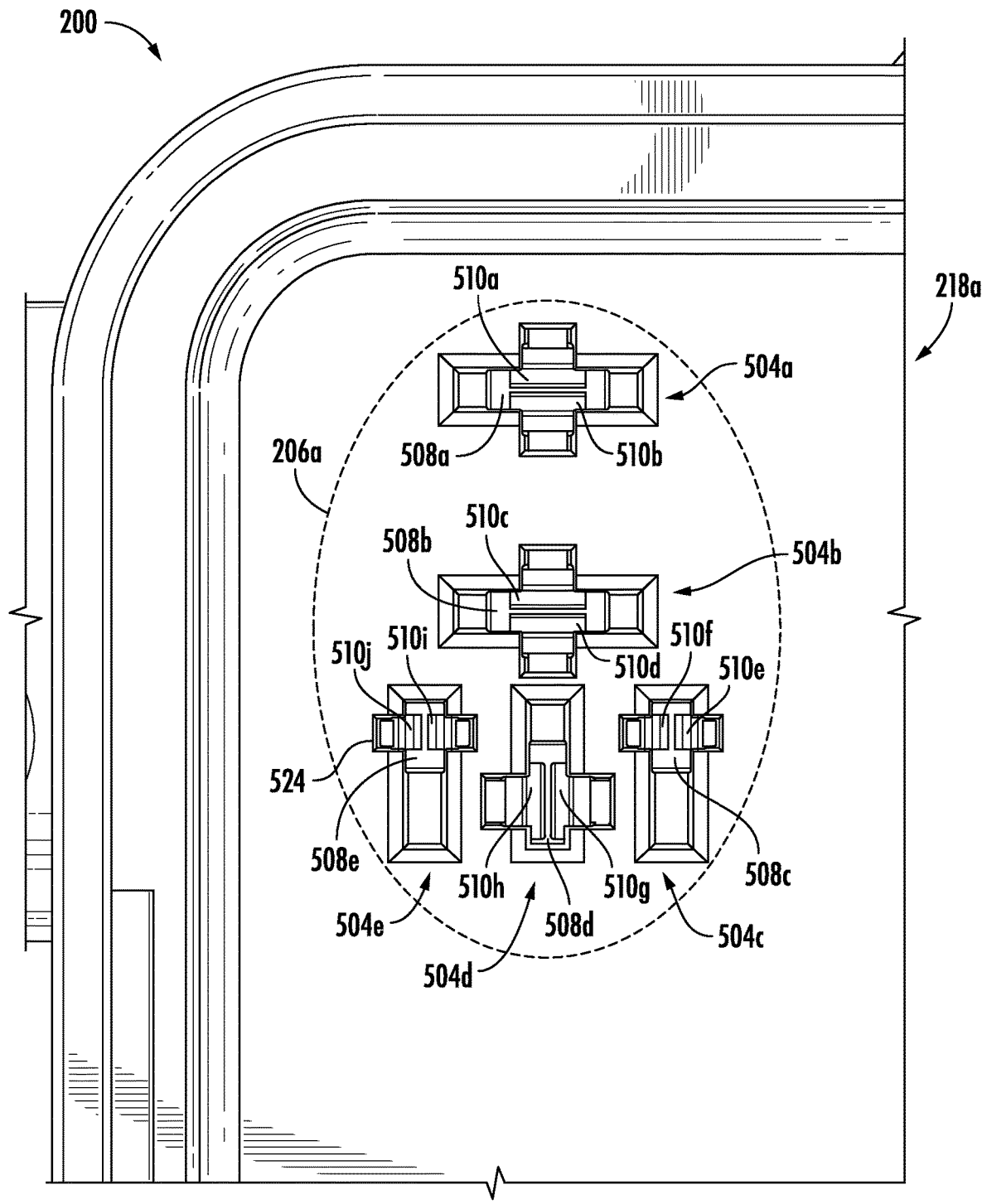
Figure 5C:
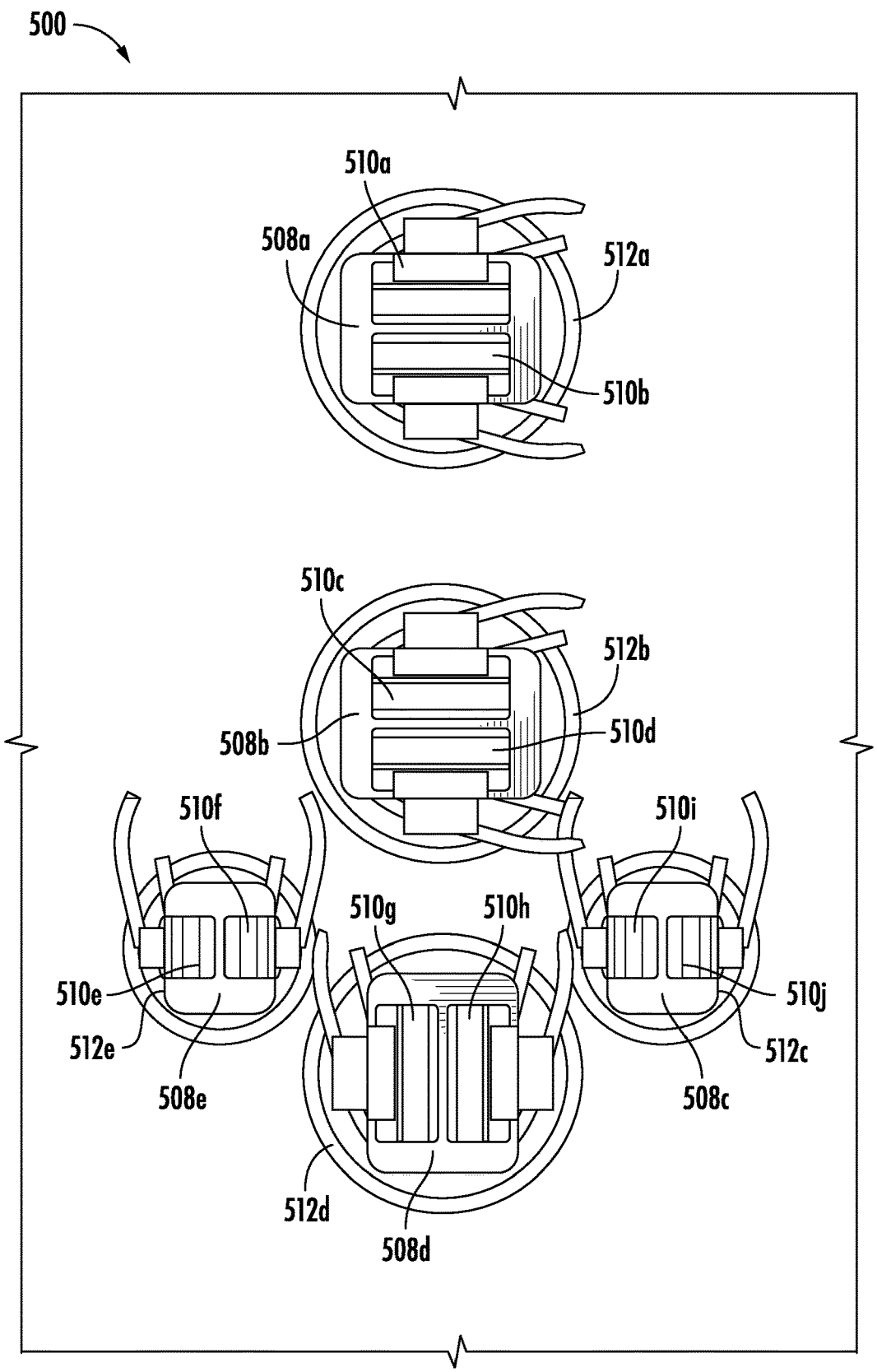

FIGS. 5A-5C are representative drawings of the component side of the electrical box 200 of FIGS. 2A and 2B, according to exemplary embodiments. FIGS. 5A and 5B are close-up views of the electrical box 200 of FIGS. 2A and 2B, according to exemplary embodiments, with the relay socket 206a (component side of housing 218a) being shown in more detail. FIG. 5C is a head-on view of a terminal arrangement 500 supported by the electrical box 200, in exemplary embodiments. FIG. 5A includes terminal seats while FIG. 5B shows the actual terminals. Five blade sockets 504a-e are shown, one for each blade of the ISO micro relay (collectively, "blade sockets 504"). For the ISO micro relay 100 (FIG. 1), blade 104a fits in blade socket 504a, blade 104b fits in blade socket 504b, blade 104c fits in blade socket 504c, blade 104d fits in blade socket 504d, and blade 104e fits in blade socket 504e.

To receive the ISO micro relay 100, the blade sockets 504 are oriented in a particular configuration. Two of the blade sockets 504a and 504b are oriented in one way (top of the relay socket 206a and horizontally disposed, in the illustrated views). The remaining three blade sockets 504c, 504d, and 504e are orientated in another way (bottom of the relay socket 206a and vertically disposed, in the illustrated views), with the blade sockets 504c, 504d, and 504e being orthogonal to the blade sockets 504a and 504b. The blade sockets 504a and 504b are of a first size ($w_1$), to correspond with the size, $w_1$, of blades 104a and 104b (FIG. 1); the blade sockets 504c, 504d, and 504e are of a different size ($w_2$), to correspond with the size, $w_2$, of blades 104c, 104d, and 104e, with $w_1 > w_2$. The blade sockets 504a and 504b are spaced a distance, $d_1$, apart, corresponding to the distance, $d_1$, between blades 104a and 104b; the spacing between blade sockets 504c and 504d ($d_2$) correspond with the distance between blades 104c and 104d; and the spacing between blade sockets 504d and 504e (also $d_2$) correspond with the distances between blades 104d and 104e, with $d_2 < d_1$. Further, though shown in two dimensions, each blade socket 504 has a depth sufficient to receive the length, l, of respective blades. Thus, the blade sockets 504 are sized to accept respective blades 104 of the ISO micro relay 100. In exemplary embodiments, the blades 104 of the ISO micro relay 100 essentially "fill" the respective blade sockets 504.

The blades 104 of the ISO micro relay 100 plug into the front of the relay socket 206a of the novel electrical box 200 while the terminals, including clips, are located in back of the relay socket. Once inserted into the relay socket 206a, the ISO micro relay 100 connects with the terminals. Terminal seats 506a-e (shown as white crosses) (collectively, "terminal seats 506") illustrate the relative position of terminals "behind" respective blade sockets 504. Recall that the terminals 202 are purchased by customers separate from purchasing the electrical box 200. If an ISO micro relay 100 is to be installed into the electrical box 200, the customer will purchase five terminals 202 for each ISO micro relay being installed. The terminal seats 506 thus indicate placement of terminals, such as the terminals 202 (FIGS. 3A and 3B) relative to the blade sockets 504 once the ISO micro relay 100 is inserted into the relay socket 206a of the novel electrical box 200.

Thus, for blade socket 504a, terminal seat 506a is shown; for blade socket 504b, terminal seat 506b is shown. A position indicator 518 (disposed vertically in FIG. 5A) indicates that the terminal seats 506a and 506b line up in the same plane with one another.

For blade socket 504c, terminal seat 506c is shown; for blade socket 504d, terminal seat 506d is shown; for blade socket 504e, terminal seat 506e is shown. A position indicator 520 (disposed horizontally in FIG. 5A) indicates that terminal seats 506c and 506e line up in the same plane with one another. However, a second position indicator 522 (disposed horizontally in FIG. 5A) indicates that terminal seat 506d is in a different plane than terminal seats 506c and 506e. In contrast to the prior art relay socket 406 (FIG. 4A), the relay socket 206a has an "off-centered" layout or geometry which allows standard terminals and wire seals to be used in the electrical box 200, in exemplary embodiments. Further, in exemplary embodiments, the positioning of the terminals ensures that the electrical box 200 supports the IP67 and IP69K ingress protection protocols.

In exemplary embodiments, the housing of the electrical box 200 is molded to have openings for fitting the blade of the ISO micro relay (on the component side) and the terminal (on the terminal side). These openings may be characterized as being "cross-shaped", the cross consisting of two intersecting bars, the first bar being disposed in one orientation and the second bar being disposed in another, right-angle orientation, such that the two bars are perpendicular to one another. Thus, in exemplary embodiments, the component side of housing 218a is molded such that resulting "cross-shaped openings" are formed in the housing for both the blades and their respective terminals. Because of the size and orientation of both the blades and the terminals, as well as the relative position of the terminals behind respective blade sockets, the cross-shaped openings vary somewhat, in some embodiments.

As viewed from the illustrations of FIGS. 5A and 5B, the cross-shaped openings for blade sockets 504a and 504b, for example, have a horizontal portion sized to accept the larger blades (104a and 104b) and a vertical portion sized to accept larger terminals in a first orientation, each resulting in a first cross-shape. Blade sockets 504c and 504e have vertical portions sized to accept the smaller blades (104c and 104e) and a horizontal portions sized to accept smaller terminals in a second orientation, each resulting in a second cross-shape. Blade socket 504d has a vertical portion sized to accept a smaller blade (104d) and a horizontal portion sized to accept a larger terminal in the second orientation, resulting in a third cross-shape. Further, since the terminal part is oriented at one edge of the blade socket, the cross-shape of blade sockets 504c and 504e looks somewhat like a small letter "t" while the cross-shape of blade socket 504d looks like an upside down small letter "t", given that the terminal part is at the opposing edge, with the vertical part of the cross being fatter for the blade socket 504d. In exemplary embodiments, the molding of the housing 218 thus facilitates the placement of the off-the shelf ISO micro relay and terminal components into the electrical box 200.

In an exemplary embodiment, the novel electrical box 200 allows for standard terminal terminals and rubber seals to be installed in offset blade sockets. In FIG. 5B, the terminals are visible through the openings of respective blade sockets 504. Terminal 508a is visible in blade socket 504a; terminal 508b is visible in blade socket 504b; terminal 508c is visible in blade socket 504c; terminal 508d is visible in blade socket 504d; and terminal 508e is visible in blade socket 504e (collectively, "terminals 508"). In exemplary embodiments, terminals 508c and 508d are of a smaller size than terminals 508a, 508b, and 508d. Further, in exemplary embodiments, the terminals 508a and 508b are in a first orientation while terminals 508c, 508d, and 508e are in a second orientation, the second orientation being orthogonal to the first orientation.

Each of the terminals 508 features two clips. Terminal 508a includes clips 510a and 510b; terminal 508b includes clips 510c and 510d; terminal 508c includes clips 510e and 510f; terminal 508d includes clips 510g and 510h; and terminal 508e includes clips 510i and 510j (collectively, "clips 510"). When respective blades 104 are inserted in the terminals 508, the clips 510 will move slightly to receive the blades. Viewed from the illustration of FIG. 5B, when blade 104a of ISO micro relay 100 (FIG. 1) is inserted in blade socket 504a, the clip 510a of the terminal 508a will move upward slightly, while the clip 510b will move downward slightly. When blade 104b is inserted in blade socket 504b, the clip 510c of the terminal 508b will move upward slightly, while the clip 510d will move downward slightly. When blade 104c is inserted into blade socket 504c, the clip 510e of the terminal 508c will move slightly to the right, while the clip 510f will move slightly to the left. When blade 104d is inserted into blade socket 504d, the clip 510g of the terminal 508d will move slightly to the right, while the clip 510h will move slightly to the left. When blade 104e is inserted in blade socket 504e, the clip 510i of the terminal 508e will move slightly to the right, while the clip 510j will move slightly to the left. The spring tension of each pair of clips 510 will maintain a connection to the respective blades 104, thus ensuring that the terminals 508 are electrically connected to the blades.

In the head-on view of the terminal arrangement 500 (FIG. 5C), the five terminals 508 are shown, with respective clips 510, as before. The terminal arrangement 500 is from the component side of the electrical box, with the electrical box not shown. The terminal seats 506 (FIG. 5A) are arranged to accommodate the terminals 508, in exemplary embodiments, with the terminals 508a and 508b arranged in one direction (with respective clips 510 to be attached above and below respective blades) and the terminals 508c, 508d, and 508e are arranged at right angles to terminals 508a and 508b (with respective clips 510 to be attached to the left and right of respective blades). Further, the terminal arrangement 500 shows that the terminals 508c and 508e are smaller than terminals 508a, 508b, and 508d.

The terminal arrangement 500 also shows rubber seals for each terminal, with the rubber seals being "behind" the clips 510. Rubber seals 512a, 512b, and 512d are a first size, with rubber seals 512c and 512e being a second, smaller size (collectively, "rubber seals 512"). The arrangement of the terminal seats 506 (FIG. 5A), as well as the attachment of terminals to respective blades (FIG. 5B), with some terminals being attached to the center of the blade and some not, ensures that the rubber seals 512 do not touch one another.

Recall that the rubber seal 314 of the terminal 202 (FIG. 3B) has a diameter, $d_3$, while the socket interface 302 has a width, $w_3$ (FIG. 3A), with the diameter, $d_3$, being larger than the width, $w_3$, and thus the widest part of the terminal 202. This is true even for terminals of different sizes. In the head-on view terminal arrangement 500 of FIG. 5C, though they are "behind" the respective terminals 508, the rubber seals 512 are each visible, as the diameter of each rubber seal is larger than that of the other components of each terminal. This is true whether a smaller rubber seal (e.g., 512c and 512e) or a larger rubber seal (e.g., 512a, 512b, and 512d) is used. In exemplary embodiments, the novel approach to terminal alignment shown in FIGS. 5A-5C allows a sealed connection to be made between each blade 104 of the ISO micro relay 100 and each terminal 202. In exemplary embodiments, the terminals 508 can be installed into and removed from the electrical box 200 with industry standard methods.

Figure 6A:
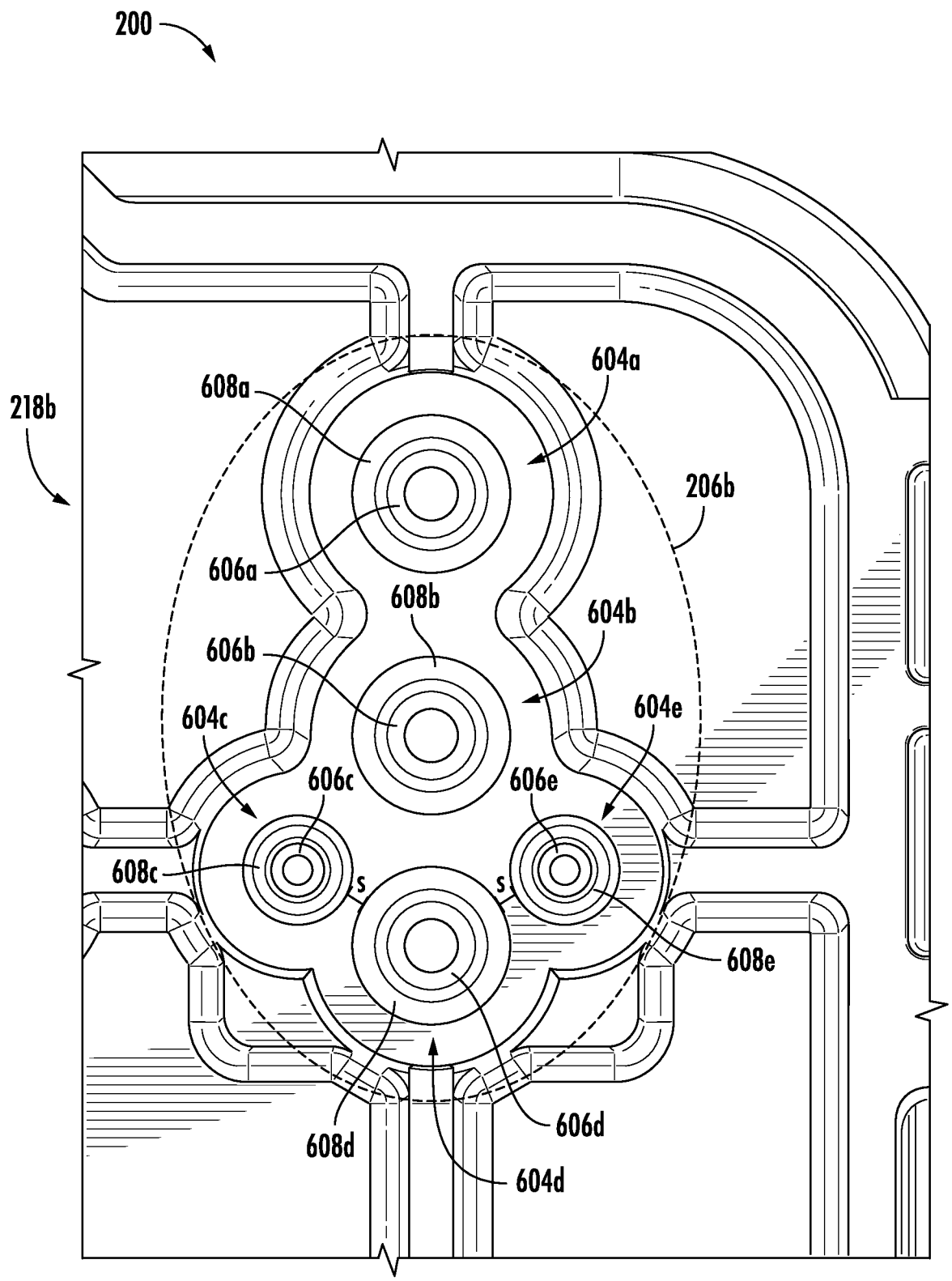
FIGS. 6A and 6B are illustrations of the relay socket (terminal side) of FIGS. 2A-2C, in accordance with exemplary embodiments.
Figure 6B:
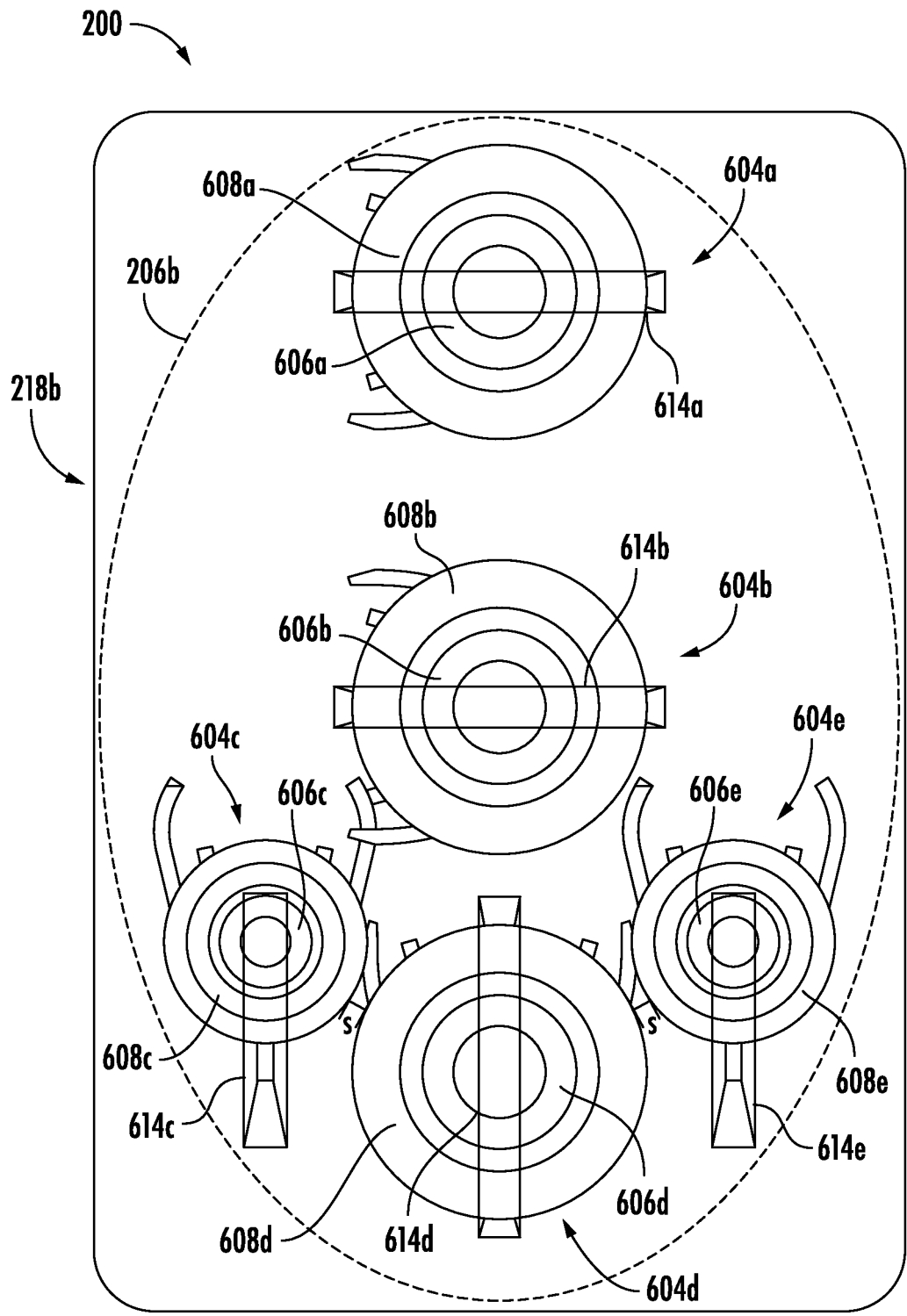

FIGS. 6A and 6B are representative drawings of the terminal side of housing 218b of the electrical box 200, according to exemplary embodiments. The illustrations show how the "offset" configuration of the relay socket 206a (component side of housing 218a) of FIGS. 5A and 5B allows space for each terminal to have a standard seal in the relay socket 206b (terminal side of housing 218b). The novel configuration thus facilitates placement of the terminals, including the rubber seals, in the relay sockets of the electrical box 200, according to exemplary embodiments, such that IP67 and IP69K ingress protection is obtained.

In exemplary embodiments, the terminal side of the relay socket 206b features elements that mate with the ISO micro relay 100 once inserted into the blade sockets 504 on the component side of the relay socket 206a. Blade socket locations 604a-e (collectively, "blade socket locations 604") are indicated as the backside locations of respective blade sockets 504a-e in FIGS. 5A and 5B and are the locations where terminals, such as terminals 202, are disposed. Accordingly, in blade socket location 604a, an insulated wire 606a surrounded by a rubber seal 608a, is shown. The insulated wire 606a and rubber seal 608a are both part of a terminal, such as terminal 202 (FIGS. 3A and 3B), which connect to blade 104a of ISO micro relay 100 (FIG. 1) once the relay is inserted into the relay socket 206a. Similarly, blade socket location 604b features insulated wire 606b surrounded by rubber seal 608b; blade socket location 604c features insulated wire 606c surrounded by rubber seal 608c; blade socket location 604d features insulated wire 606d surrounded by rubber seal 608d; and blade socket location 604e features insulated wire 606e surrounded by rubber seal 608e (collectively, "insulated wires 606" and "rubber seals 608").

In exemplary embodiments, the blade socket locations 604a, 604b, and 604d are larger than the blade socket locations 604c and 604e. This corresponds to the terminals 508a, 508b, and 508d being larger in size than the terminals 508c and 508d (FIGS. 5A-5C). Although the orientation of terminals 508a and 508b are orthogonal to the orientation of terminals 508c, 508d, and 508e, this is not evident on the terminal side of the relay socket 206b.

In exemplary embodiments, between the blade socket locations 604e and 604d, there is a space, s; similarly, between the blade socket locations 604d and 604c, there is a space, s. The space, s, ensures that there is sufficient spacing so that respective rubber seals 608 do not overlap one another. Once the terminals are in place in the electrical box, the rubber seals 608 fit tightly against the housing of the electrical box 200, in exemplary embodiments. When the ISO micro relay 100 is installed in the relay socket 206a, the pair of clips of each terminal will become attached to the respective relay blades. In exemplary embodiments, the tight fitting of the rubber seals 608 of the terminals 202 provides a seal against the housing of the electrical box 200, preventing water or contaminants from entering the electrical box. In exemplary embodiments, the electrical box 200 satisfies both IP67 (total protection from dust and protected from temporary liquid immersion) and IP69K (proven to resist ingress of high temperature and pressure wash) Ingress Protection ratings with the novel arrangement of the relay socket.

FIG. 6B is a second terminal side view of the electrical box 200, again featuring the relay socket 206b. In this view, blade location indicators 614a-e (collectively, "blade location indicators 614") for the ISO micro relay 100 are shown. Blade location indicators 614a and 614b, for the blade socket locations 604a and 604b, respectively, indicate that respective terminals are positioned in the middle of the blade socket location. The insulated wire 606a, for example, is disposed in the center of the blade location indicator 614a, and the rubber seal 608a is also disposed such that its center is in the center of the blade location indicator and its circumferential edges are equidistant from the left and right edges of the blade location indicator. The same is true for the insulated wire 606b and rubber seal 608b, both are positioned in the middle of the blade location indicator 614b.

In exemplary embodiments, the blade location indicators 614c, 614d, and 614e show that the terminals are not positioned in the middle of the blade socket locations but are each in offset positions relative to the blade sockets. Insulated wire 606c and rubber seal 608c, for example, are disposed at one end of the blade location indicator 614c (to the end closer to blade location indicator 614b). Similarly, insulated wire 606e and rubber seal 608e are disposed at one end of the blade location indicator 614c (to the end closer to blade location indicator 614b). Thus, in exemplary embodiments, terminals connect at the top, not at the center, of the blades 104c and 104e. Insulated wire 606d and rubber seal 608d, on the other hand, are disposed at the other end of the blade location indicator 614d (end that is farther away from blade location indicator 614b). Thus, in exemplary embodiments, a terminal connects at the bottom, not the center, of the blade 104d. In this manner, all blades 104 of the ISO micro relay 100 are connected to terminals and the rubber seals 608 are able to be positioned flush against the housing of the electrical box 200, ensuring that the electrical box satisfies IP67 and IP69K ingress protection ratings.

Figure 7A:
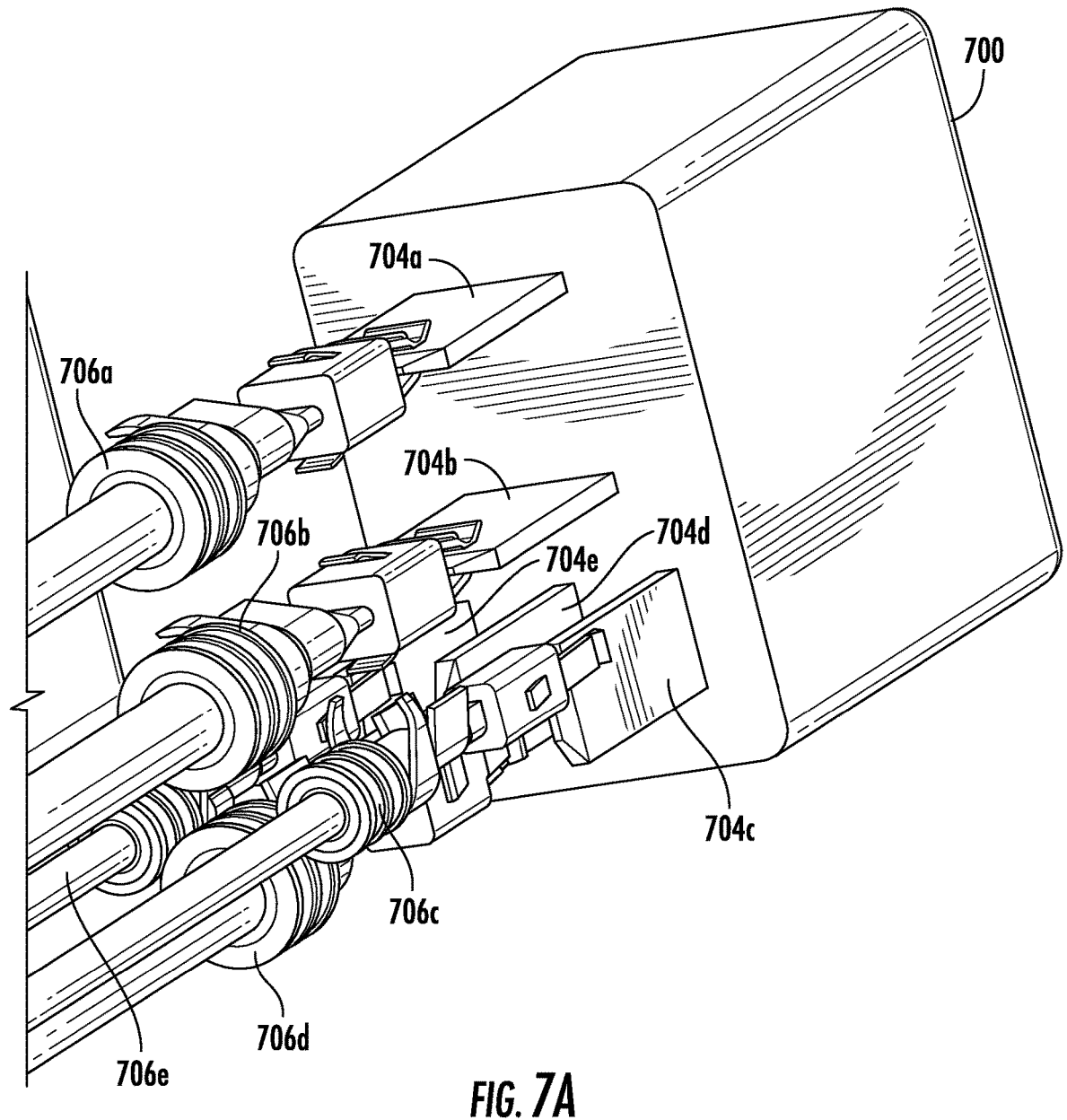
FIGS. 7A and 7B are illustrations of an ISO Micro relay connected to terminals as in the electrical box of FIGS. 2A-2C, in accordance with exemplary embodiments.
Figure 7B:
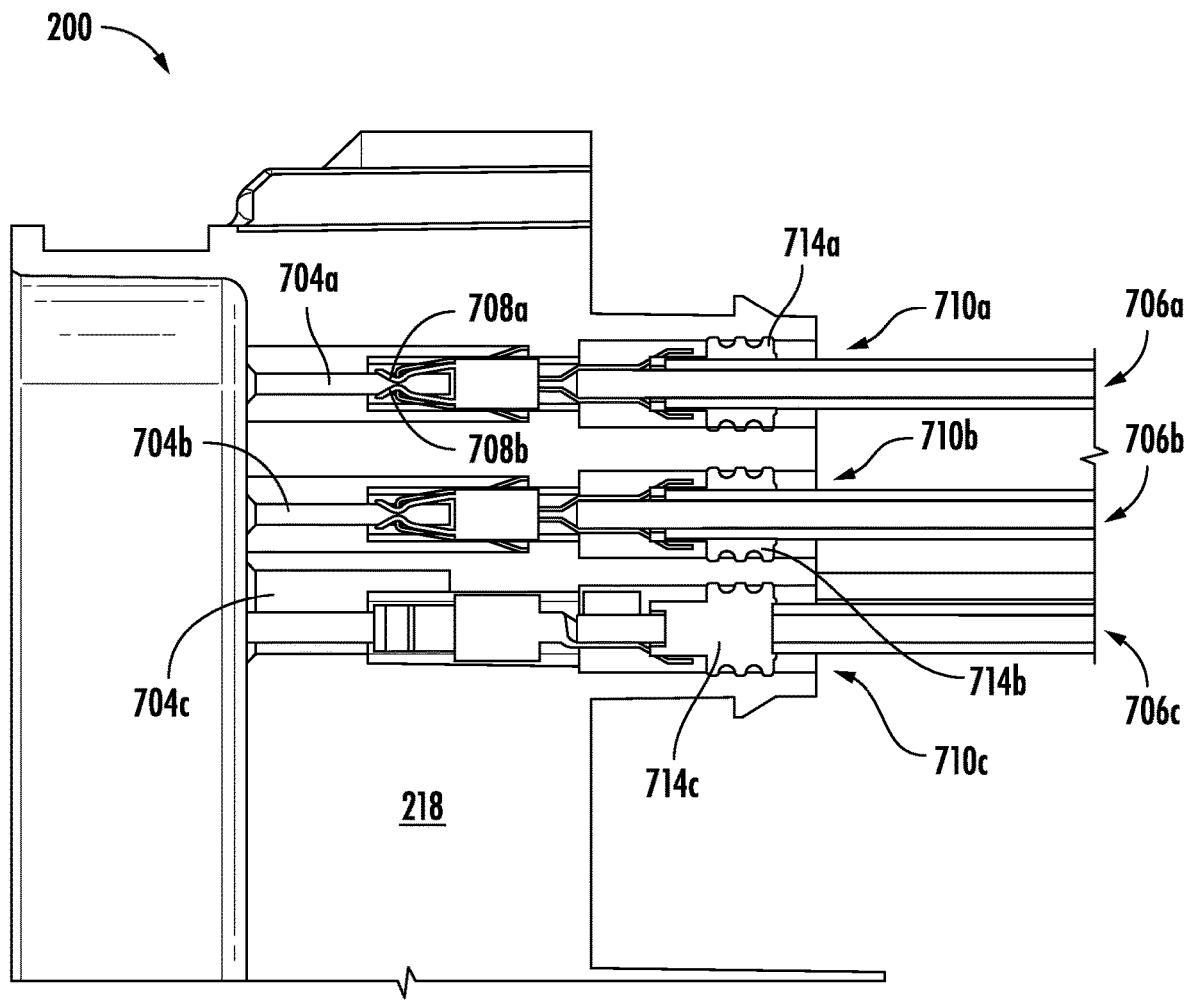

FIGS. 7A and 7B are representative drawings of an ISO micro relay 700 connected to terminals, where the terminals are arranged as they would be in the electrical box 200, according to exemplary embodiments. FIG. 7A shows a perspective view of the ISO micro relay 700 without housing while FIG. 7B shows a side view of the ISO micro relay 700 within the housing 218 of the electrical box 200. The ISO micro relay 700 includes blades 704a-e, arranged just as with the ISO micro relay 100 (FIG. 1). Terminal 706a connects to blade 704a; terminal 706b connects to blade 704b; terminal 706c connects to blade 704c; terminal 706d connects to blade 704d; and terminal 706e connects to blade 704e (collectively, "blades 704" and "terminals 706").

In exemplary embodiments, terminal 706a is positioned so that it connects to the center of blade 704a; similarly, terminal 706b is positioned so that it connects to the center of blade 704b. By contrast, terminal 706c is positioned so that it connects to the top of blade 704c; similarly, terminal 706e is positioned so that it connects to the top of blade 704e. Finally, terminal 706d is positioned so that it connects to the bottom of blade 704d. Further, terminals 706c and 706e are smaller than terminals 706a, 706b, and 706d. These arrangements are consistent with the illustrations and descriptions of FIGS. 5A, 5B, 5C and 6B, above. By using smaller terminals for blades 704c and 704e and by staggering the connection location of terminals 706c, 706d, and 706e, the rubber seals of all five terminals 706 are able to fit flush against the electrical box so as to provide the desired ingress/egress protection.

Blades 704a, 704b and 704c are visible in the side view of FIG. 7B and are connected to terminals 706a, 706b, and 706c, respectively. Rubber seal 714a of terminal 706a fits into cylindrical opening 710a of the housing 218 of the electrical box 200; rubber seal 714b of terminal 706b fits into cylindrical opening 710b of the housing; and rubber seal 714c of terminal 706c fits into the cylindrical opening 710c of the housing (collectively, "cylindrical openings 710" and "rubber seals 714"). Clips 708a and 708b of terminal 706a are shown on either side of blade 704a (collectively, "clips 708").

In exemplary embodiments, the cylindrical openings 710 are sized in a telescoping manner such that the smallest part of each terminal 706 (the clips 708) fit into a smaller portion of the cylinder, and the rubber seals 714 fit into a larger portion of the cylinder. In exemplary embodiments, the size of the cylindrical openings 710 vary, depending on the size of the terminals 706. Thus, the cylindrical opening 710a and 710b are sized to fit respective larger terminals 706a and 706b while the cylindrical openings 710c are sized to fit a smaller terminal 706c. In exemplary embodiments, the diameter of each rubber seal 714 fills the space of respective cylindrical opening 710 of the housing 218 and forms a secure, water- and air-tight connection. In exemplary embodiments, the abutting of the rubber seals 714 against the cylindrical openings 710 of the housing 218 ensure that the electrical box 200 satisfies IP67 and IP69K ingress protection ratings, as water and other contaminants are not able to get past the rubber seals. Thus, in exemplary embodiments, the blades 704 and the clips 708 of the terminals 706 will not get wet or otherwise contaminated.

Thus, a novel electrical box features Ingress Protection ratings of IP67 and IP69K, in exemplary embodiments. The housing of the electrical box is designed such that the rubber seals of each terminal fit snugly into cylindrical spaces of the housing. The electrical box is able to house and support ISO micro relays having five terminals, as shown and described above.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An electrical box comprising:
a housing comprising a relay socket, the relay socket comprising:
a first blade socket;
a second blade socket adjacent and parallel to the first blade socket;
a third blade socket orthogonal to the first blade socket, wherein the third blade socket is adjacent to the second blade socket, wherein the relay socket is adapted to accept an International Standards Organization (ISO) micro relay;
a first terminal seat disposed in a center position of the first blade socket, wherein the first terminal seat is adapted to receive a first terminal;
a second terminal seat disposed in a center position of the second blade socket, wherein the second terminal seat is adapted to receive a second terminal;
a third terminal seat disposed in a first end of the third blade socket, wherein the third terminal seat is adapted to receive the third terminal;
a fourth blade socket orthogonal to the first blade socket; and
a fifth blade socket orthogonal to the first blade socket, wherein the fourth blade socket and the fifth blade socket are adjacent to the second blade socket, with the fourth blade socket being between the third blade socket and the fifth blade socket;
wherein:
the first blade socket is adapted to receive a first blade of the ISO micro relay;
the second blade socket is adapted to receive a second blade of the ISO micro relay;
the third blade socket is adapted to receive a third blade of the ISO micro relay;
the fourth blade socket is adapted to receive a fourth blade of the ISO micro relay; and
the fifth blade socket is adapted to receive a fifth blade of the ISO micro relay.

2. The electrical box of claim 1, further comprising a fourth terminal seat disposed at a second end of the fourth blade socket.

3. The electrical box of claim 2, further comprising a fifth terminal seat disposed at a third end of the fifth blade socket, wherein the first end and the third end are in a first plane and the second end is in a second plane.

4. The electrical box of claim 1, further comprising:
a cover to be fit over the housing; and
a seal disposed between the cover and the housing;
wherein the electrical box, when sealed with the cover, satisfies IP67 and IP69K ingress protection ratings.

5. The electrical box of claim 3, the housing further comprising:
a first cylindrical opening of a first size adapted to receive the first terminal;
a second cylindrical opening of the first size adapted to receive the second terminal; and
a third cylindrical opening of a second size adapted to receive the third terminal, wherein the second size is smaller than the first size.

6. The electrical box of claim 5, wherein:
the third terminal seat is adapted to receive the third terminal of the second size; and
the fifth terminal seat is adapted to receive a fifth terminal of the second size.

7. The electrical box of claim 6, wherein:
the first terminal seat is adapted to receive the first terminal in a first direction; and
the second terminal seat is adapted to receive the second terminal in the first direction.

8. The electrical box of claim 7, wherein the fourth terminal seat is adapted to receive a fourth terminal in a second direction, the second direction being orthogonal to the first direction.

9. The electrical box of claim 8, wherein:
the third terminal seat is adapted to receive the third terminal in the second direction; and
the fifth terminal seat is adapted to receive the fifth terminal in the second direction.

10. A relay socket comprising:
a first blade socket adapted to receive a first blade of an International Standards Organization (ISO) micro relay, the first blade socket having a first edge and a second edge;
a first terminal seat disposed at the first edge of the first blade socket, wherein the first terminal seat is adapted to receive a first terminal;
a second blade socket adjacent and parallel to the first blade socket, the second blade socket being adapted to receive a second blade of the ISO micro relay, the second blade socket having a third edge and a fourth edge, wherein the third edge is proximate the first edge and the fourth edge is proximate the second edge;
a second terminal seat disposed at the fourth edge of the second blade socket, wherein the second terminal seat is adapted to receive a second terminal;
a third blade socket adjacent and parallel to the second blade socket, the third blade socket being adapted to receive a third blade of the ISO micro relay, the third blade socket having a fifth edge and a sixth edge, wherein the fifth edge is proximate the third edge and the sixth edge is proximate the fourth edge;
a third terminal seat disposed at the fifth edge of the third blade socket, wherein the third terminal seat is adapted to receive a third terminal;
a fourth blade socket orthogonal to the first blade socket, the fourth blade socket being adapted to receive a fourth blade of the ISO micro relay;

a fourth terminal seat disposed at a first center position of the fourth blade socket, wherein the fourth terminal seat is adapted to receive a fourth terminal;

a fifth blade socket orthogonal to the first, second, and third blade sockets, the fifth blade socket being parallel to the fourth blade socket, the fifth blade socket being adapted to receive a fifth blade of the ISO micro relay; and a fifth terminal seat disposed at a second center position of the fifth blade socket, wherein the fifth terminal seat is adapted to receive a fifth terminal;

wherein:

the fourth blade socket is a first size and the fifth blade socket is the first size; and the first blade socket is a second size, the second blade socket is the second size, and the third blade socket is the second size, wherein the second size is smaller than the first size.

11. A housing for use in an electrical box, the housing comprising:

a component side and a terminal side; and a relay socket adapted to receive an International Standards Organization (ISO) micro relay, the relay socket comprising:

a first cross-shaped opening adapted to receive:

a first blade of the ISO micro relay on the component side; and a first terminal on the terminal side;

a second cross-shaped opening adapted to receive:

a second blade of the ISO micro relay on the component side; and a second terminal on the terminal side;

a third cross-shaped opening adapted to receive:

a third blade of the ISO micro relay on the component side;

a third terminal on the terminal side, wherein the second cross-shaped opening is identical to the third cross-shaped opening;

a fourth cross-shaped opening adapted to receive:

a fourth blade of the ISO micro relay on the component side;

a fourth terminal on the terminal side, wherein the first cross-shaped opening is identical to the fourth cross-shaped opening;

a fifth cross-shaped opening adapted to receive:

a fifth blade of the ISO micro relay on the component side; and a fifth terminal on the terminal side, wherein the fifth cross-shaped opening is different from the first cross-shaped opening and the second cross-shaped opening.

12. The housing of claim 11, wherein:

the first cross-shaped opening is a first size and is adapted to receive the first terminal;

the second cross-shaped opening is a second size and is adapted to receive the second terminal; and the third cross-shaped opening is the second size and is adapted to receive the third terminal.

13. The housing of claim 11, wherein:

the first cross-shaped opening is adapted to receive the first terminal in a first orientation;

the second cross-shaped opening is adapted to receive the second terminal in a second orientation, the second orientation being orthogonal to the first orientation;

the fourth cross-shaped opening is adapted to receive the fourth terminal in the first orientation; and the fifth cross-shaped opening is adapted to receive the fifth terminal in the second orientation.

* * * * *